United States Patent
Müller et al.

(10) Patent No.: US 7,785,694 B2
(45) Date of Patent: Aug. 31, 2010

(54) PANEL ARRANGEMENT FOR AN INTERIOR LINING OF A PASSENGER CABIN IN AN AIRCRAFT

(75) Inventors: Rainer Müller, Rosengarten (DE); Peter Turanski, Süstedt (DE); Wilko Oestereich, Syke (DE); Reinelt Thorsten, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 198 days.

(21) Appl. No.: 10/596,981

(22) PCT Filed: Jan. 5, 2005

(86) PCT No.: PCT/EP2005/000040

§ 371 (c)(1),
(2), (4) Date: Sep. 6, 2006

(87) PCT Pub. No.: WO2005/068288

PCT Pub. Date: Jul. 28, 2005

(65) Prior Publication Data

US 2007/0003733 A1    Jan. 4, 2007

(30) Foreign Application Priority Data

Jan. 5, 2004    (DE) .................. 10 2004 001 080

(51) Int. Cl.
*B32B 3/12* (2006.01)
*B32B 5/16* (2006.01)
(52) U.S. Cl. .................. 428/116; 244/119; 428/209; 428/326; 428/920; 428/921
(58) Field of Classification Search .................. 428/116, 428/209, 326, 920, 921; 244/119
See application file for complete search history.

(56) References Cited

U.S. PATENT DOCUMENTS 2,581,625 A * 1/1952 Brady .................. 244/129.1

(Continued)

FOREIGN PATENT DOCUMENTS

EP    0279620 A2    8/1988

(Continued)

OTHER PUBLICATIONS

Sigrafil(R) Corp. "Sigrafil(R) Carbon Fiber Reinforced Plastics (CFRP) Components" http://www.sglcarbon.com/php/print.php4.*
WayBack Machine Results for Sigrafil® Corp. website given above.*
FAR Part 29 Sec. 29.1181. FAA Designated Fire Zones.*

*Primary Examiner*—David R Sample
*Assistant Examiner*—Nicole T Gugliotta
(74) *Attorney, Agent, or Firm*—Fowler White Boggs P.A.; Christopher Paradies

(57) ABSTRACT

The invention relates to an arrangement for lining the interior of a passenger vehicle such as an airplane including a honeycomb formation of several honeycombs arranged side by side. At its end, the honeycomb body is supported by a cover layer supported above and below the honeycomb formation such that by means of two cover layers glued onto the honeycomb formation, a layer design of the honeycomb paneling is created, which layer design is arranged so as to extend parallel to the outer skin of the aircraft and follow the curvature of the outer skin. The honeycomb formation used is made of paper or aramide honeycombs or of a mixed combination of both honeycomb types; on whose cross section of the honeycomb body a CFK cover layer is positioned to both ends of the honeycomb bodies. As an alternative, further CFK insulation layers are glued onto the outer surface of the respective cover layer supported above and below the honeycomb formation, which cover layers comprise a CFK or GFK. Moreover, the layer design of the honeycomb paneling may comprise further honeycomb formations which are additionally stacked on and glued to the honeycomb formation used.

21 Claims, 8 Drawing Sheets

U.S. PATENT DOCUMENTS

Figure 1:
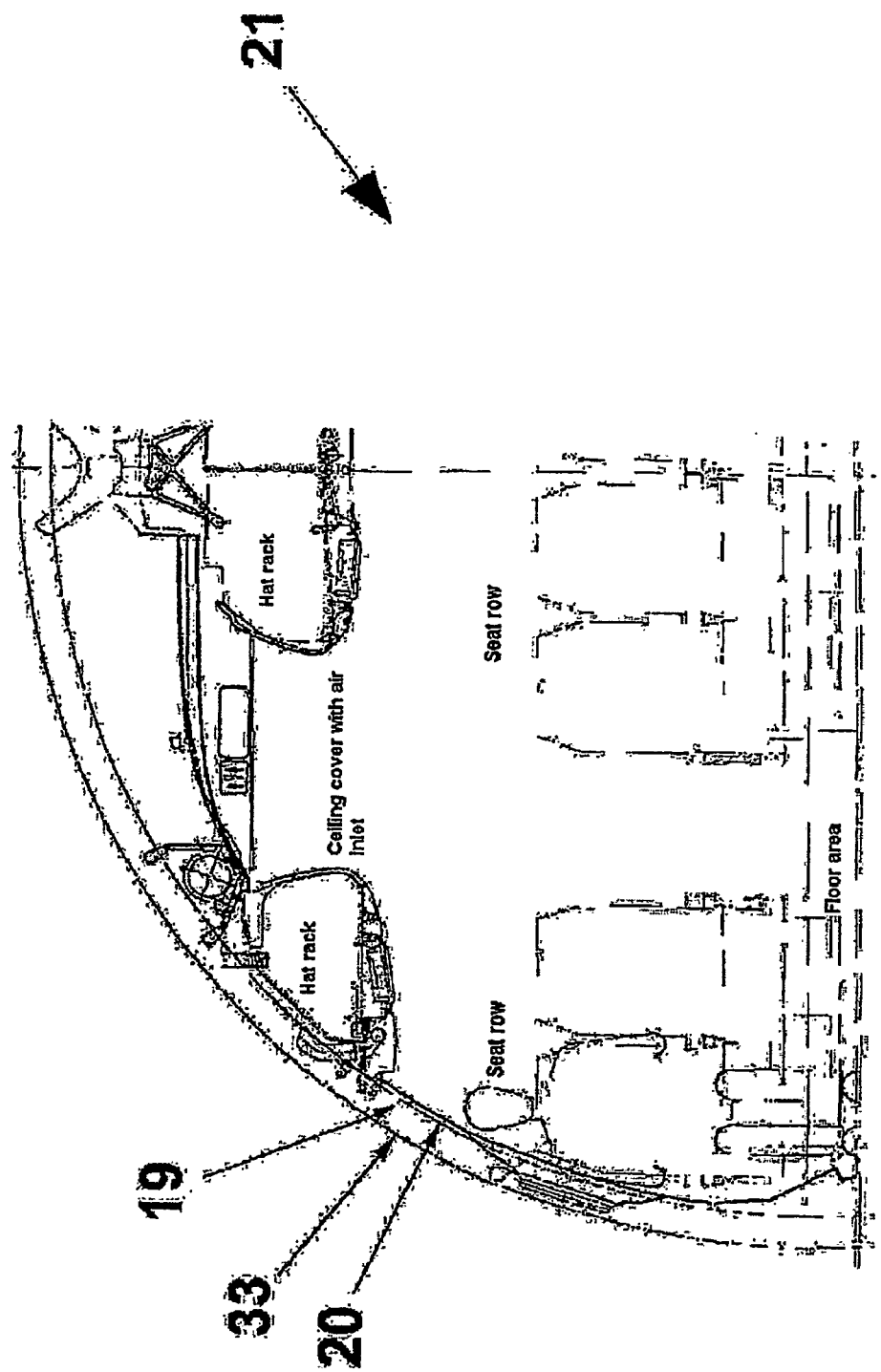

| | | |
|---|---|---|
| 3,567,162 A | 3/1971 | Lea |
| 3,811,997 A | 5/1974 | Yuan |
| 4,299,872 A | 11/1981 | Miguel et al. |
| 4,557,961 A * | 12/1985 | Gorges ................ 428/117 |
| 4,567,076 A | 1/1986 | Therrien |
| 4,598,007 A | 7/1986 | Kourtides et al. |
| 4,759,964 A | 7/1988 | Fischer et al. |
| 5,154,373 A | 10/1992 | Scott |
| 6,511,730 B1 | 1/2003 | Blair et al. |
| 2006/0284014 A1 * | 12/2006 | Muller et al. ............... 244/119 |

FOREIGN PATENT DOCUMENTS

| | | |
|---|---|---|
| EP | 0624462 A1 | 11/1994 |
| EP | 1055513 A1 | 11/2000 |
| EP | 1046576 B1 | 10/2006 |
| WO | 85/03032 A1 | 7/1985 |
| WO | 98/34782 A1 | 8/1998 |
| WO | 00/75012 A1 | 12/2000 |

* cited by examiner

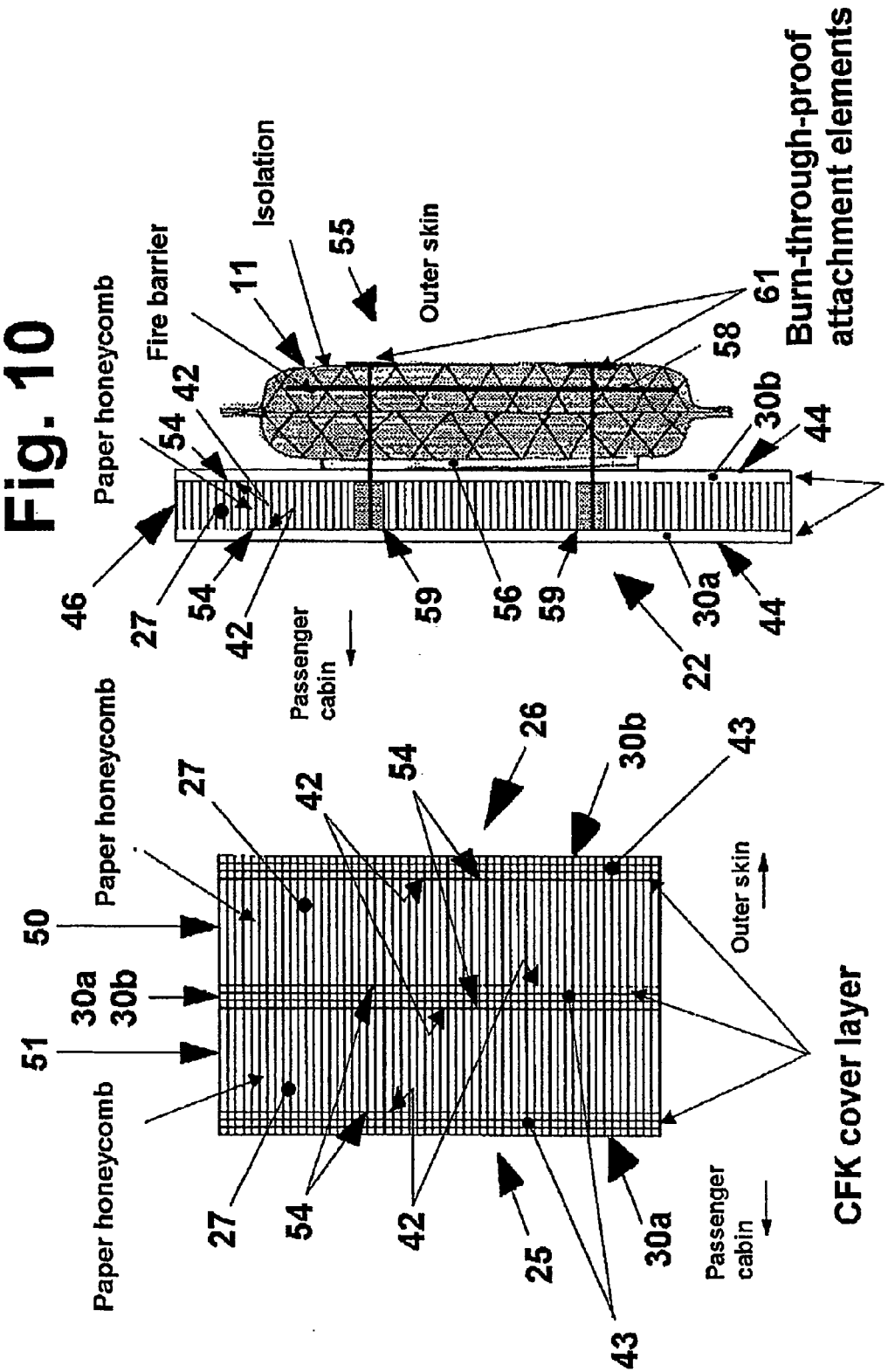

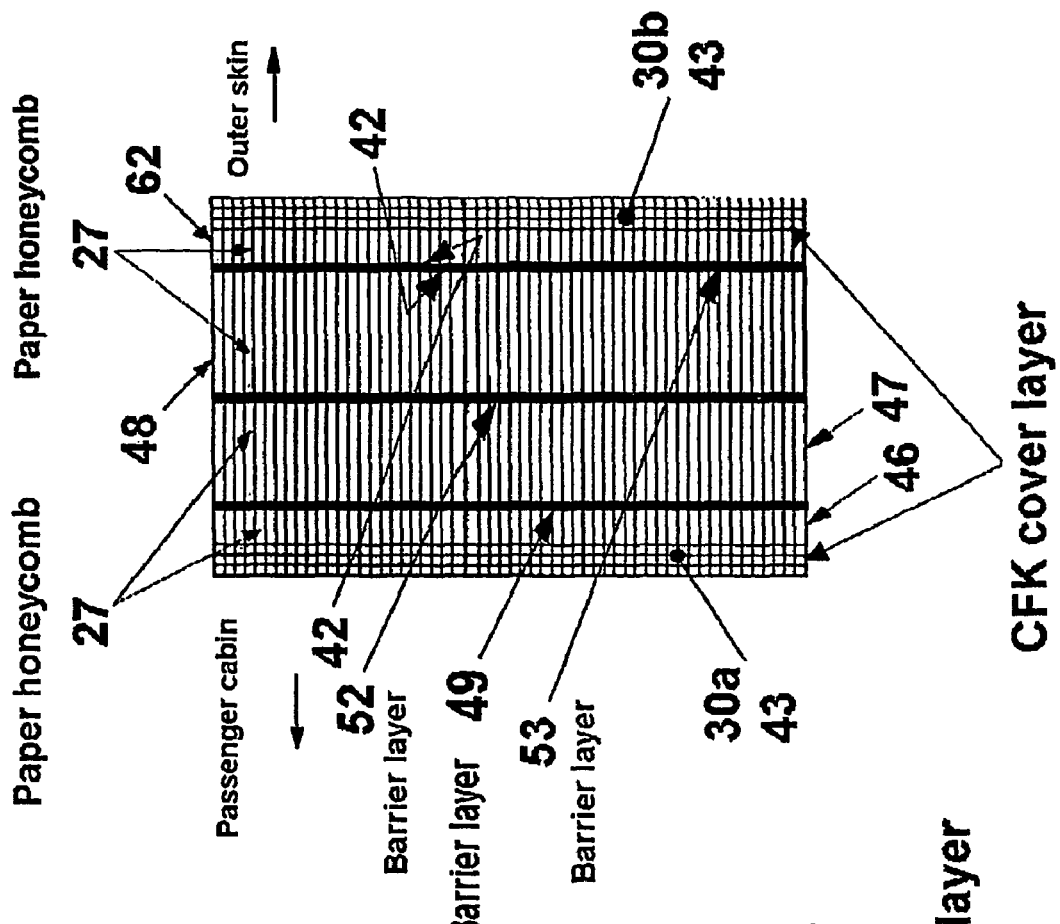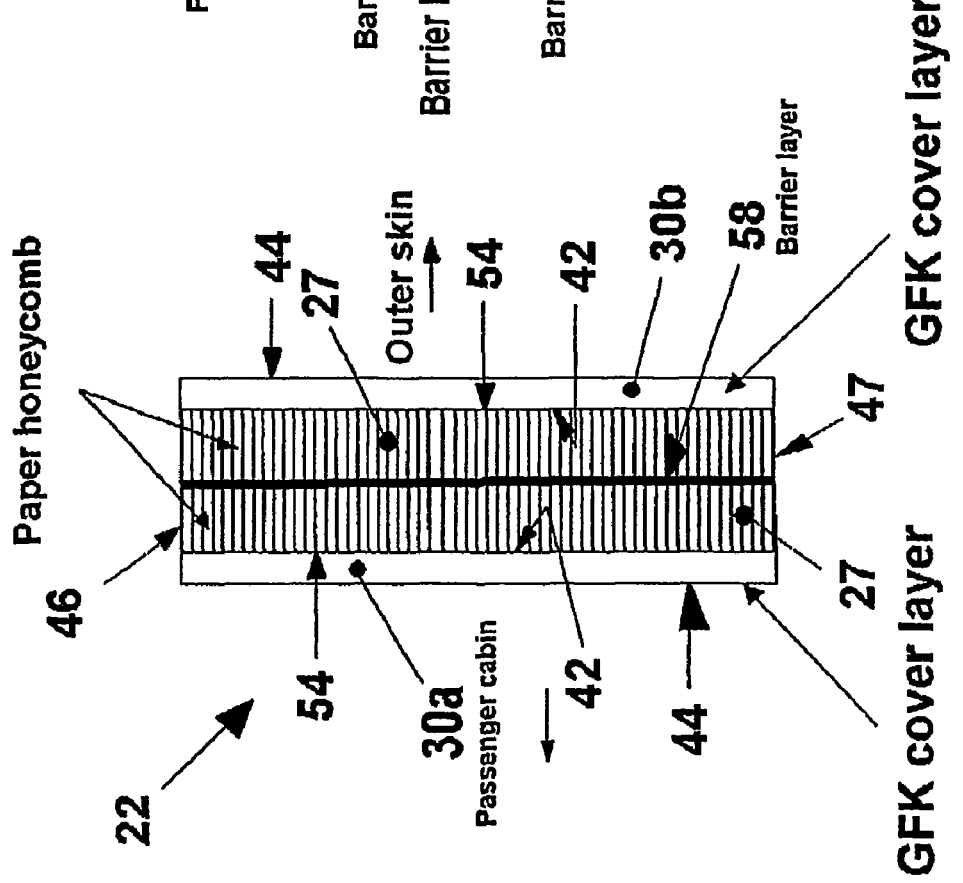

PANEL ARRANGEMENT FOR AN INTERIOR LINING OF A PASSENGER CABIN IN AN AIRCRAFT

FIELD OF THE INVENTION

The field relates to an interior paneling or interior trim of a vehicle. In particular, the field relates to an arrangement for an interior paneling, interior trim or lining of a cabin of an aircraft.

BACKGROUND OF THE INVENTION

From the field of aircraft engineering, largely combustible interior panelling is known with which the aircraft fuselage structure is lined near the outer skin of the fuselage. In this arrangement, in a space enclosed by the outer skin and the interior panelling, an insulation system may be installed which is arranged close to said outer skin, as shown in the enclosed FIG. 1.

The printed publication WO 00/75012 A1 discloses an aircraft fuselage insulation which is stated to be "fire-resistant". This printed publication discloses an insulation package which is arranged as primary insulation within a space situated between the interior panelling of the fuselage and the outer skin of the fuselage. In this arrangement that insulation package is protected in regions by a foil made of a fire-blocking material, wherein this foil region which acts in a fire-blocking way directly faces the outer skin of the fuselage (in the manner of a protective shield against fire). Furthermore, the printed publication proposes corresponding attachment elements for attaching the fuselage insulation, which elements mostly comprise polymers, for example, a. In one example, the plastic is a polyamide.

However, in relation to the application of such insulation systems (in aircraft), as far as the type of attachment and design of an insulation package used for insulating the fuselage, and as far as the interior panelling (inner panels), which is stated to be a fire-blocking material, are concerned, it is believed that no important improvements can be detected from the WO 00/75012 A1 with which, in a catastrophic fire, the spread of fire through the aircraft fuselage insulation and through the interior panelling of the aircraft would not only be retarded (impeded) but completely prevented.

SUMMARY OF THE INVENTION

According to an exemplary embodiment, an arrangement of an interior panel of an aircraft passenger cabin is provided, with which a space enclosed by the interior panelling and an outer skin of an aircraft is substantially filled.

Such arrangement may provide protection against unforeseen fire situations, in which arrangement the interior panelling may comprise honeycomb panelling made up of a honeycomb formation of several honeycombs arranged side by side.

A honeycomb body on the end of the cross section of the honeycomb body may be supported by and/or glued to a cover layer supported above and below the honeycomb formation such that by means of a top-supported cover layer facing the passenger cabin, and a bottom-supported cover layer facing a space, and a honeycomb body sandwiched between the two cover layers, a layer design of the honeycomb panelling is created, which layer design may be arranged so as to extend substantially parallel to the outer skin and follow the curvature of the outer skin. This combination may comprise the following characteristics, according to which the honeycomb formation used may be made of paper- or aramide honeycombs or of a mixed combination of both honeycomb types, on whose cross section of the honeycomb body to both ends of the honeycomb bodies a CFK cover layer may be positioned, and/or further CFK insulation layers may be glued to the outer surface of the respective cover layer supported above and below the honeycomb formation.

The cover layer may comprise a CFK or GFK; and/or the layer design of the honeycomb panelling may comprise further honeycomb formations which may be additionally stacked on and glued to the honeycomb formation used.

It is believed that an exemplary embodiment of the present invention may provide for an improved arrangement for the interior panelling of a vehicle such as an aircraft, with which interior panelling the fuselage structure, which is situated in close proximity to the outer skin, is almost entirely lined, to such an extent that with it the flames of a seat of fire acting from outside the aircraft environment are largely prevented from entering the cabin space of the aircraft. The design of the interior panelling and an insulation package attached to it are believed to be suitable for implementing an increase in the fire protection safety of separated interior regions that are situated near a structural outer skin.

The arrangement according to an exemplary embodiment is believed to prevent the spread of flames acting from outside the aircraft environment, of a source of fire, from penetrating the interior panelling, wherein the design of the interior panelling and the attachment of an insulation package to the interior panelling is implemented in such a way that the cabin region of the aircraft is protected against fire spreading from outside the aircraft environment, and evacuation of the passengers from the vehicle is clearly facilitated.

It is believed that passenger cabins of an aircraft, for example of commercial plane of the type "Boeing" or "Airbus", may thus be constructed so that they are even better protected against fire spreading from outside the aircraft surroundings, as can happen in a catastrophe in the case of an aircraft that has made an emergency landing or my withstand such fire for an extended time.

SHORT DESCRIPTION OF THE DRAWINGS

Figure 2:
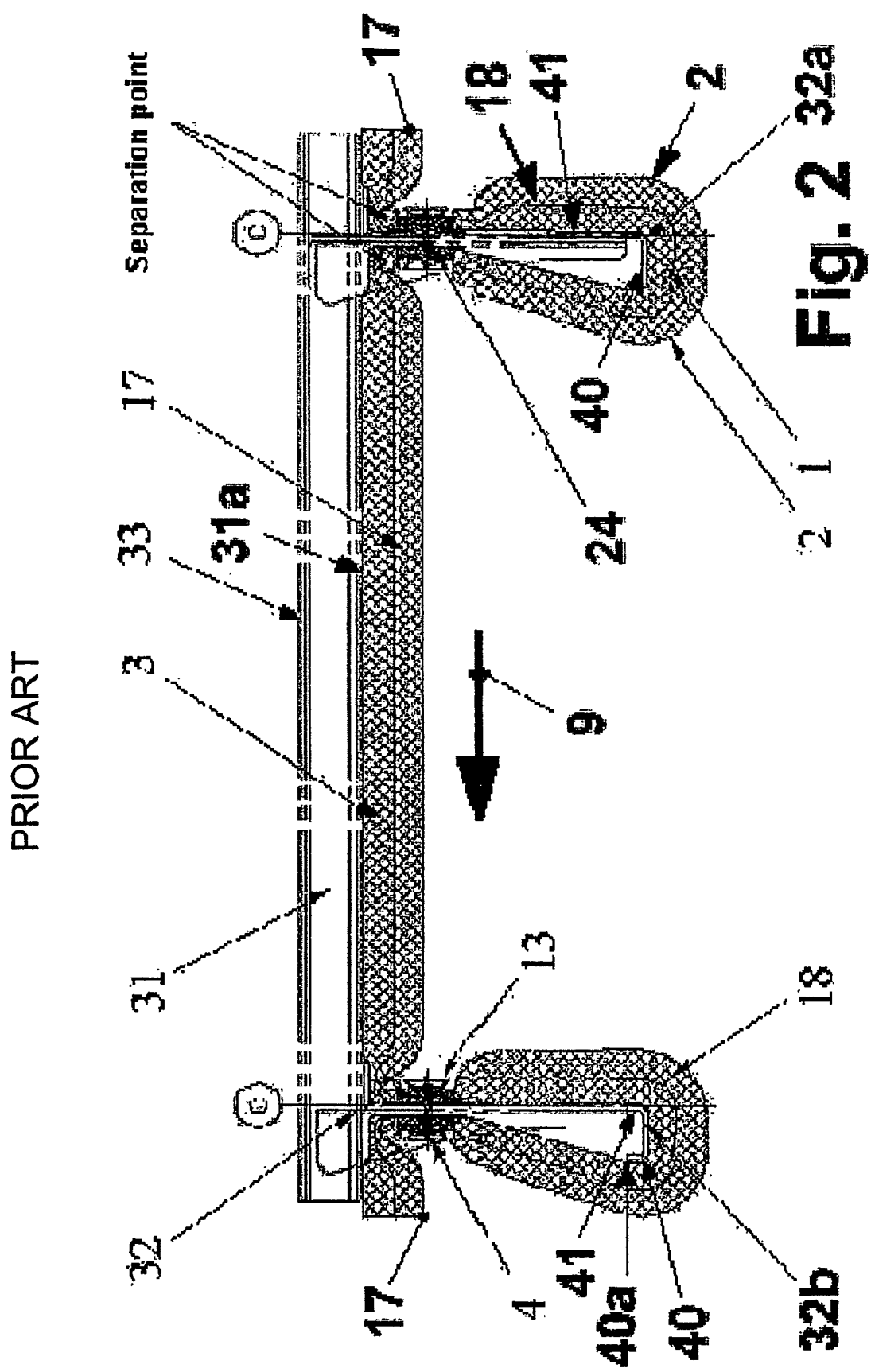
Figure 3:
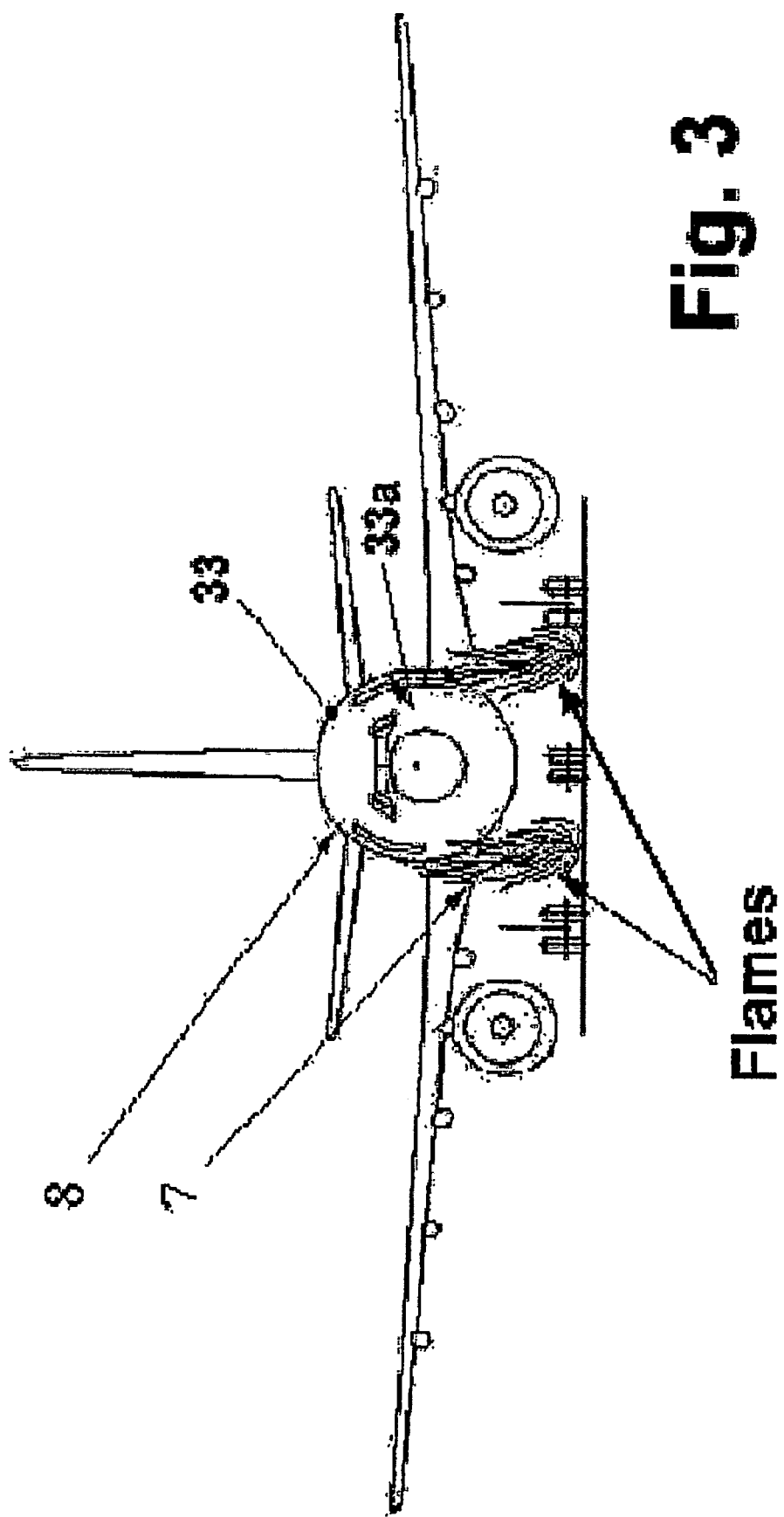
Figure 4:
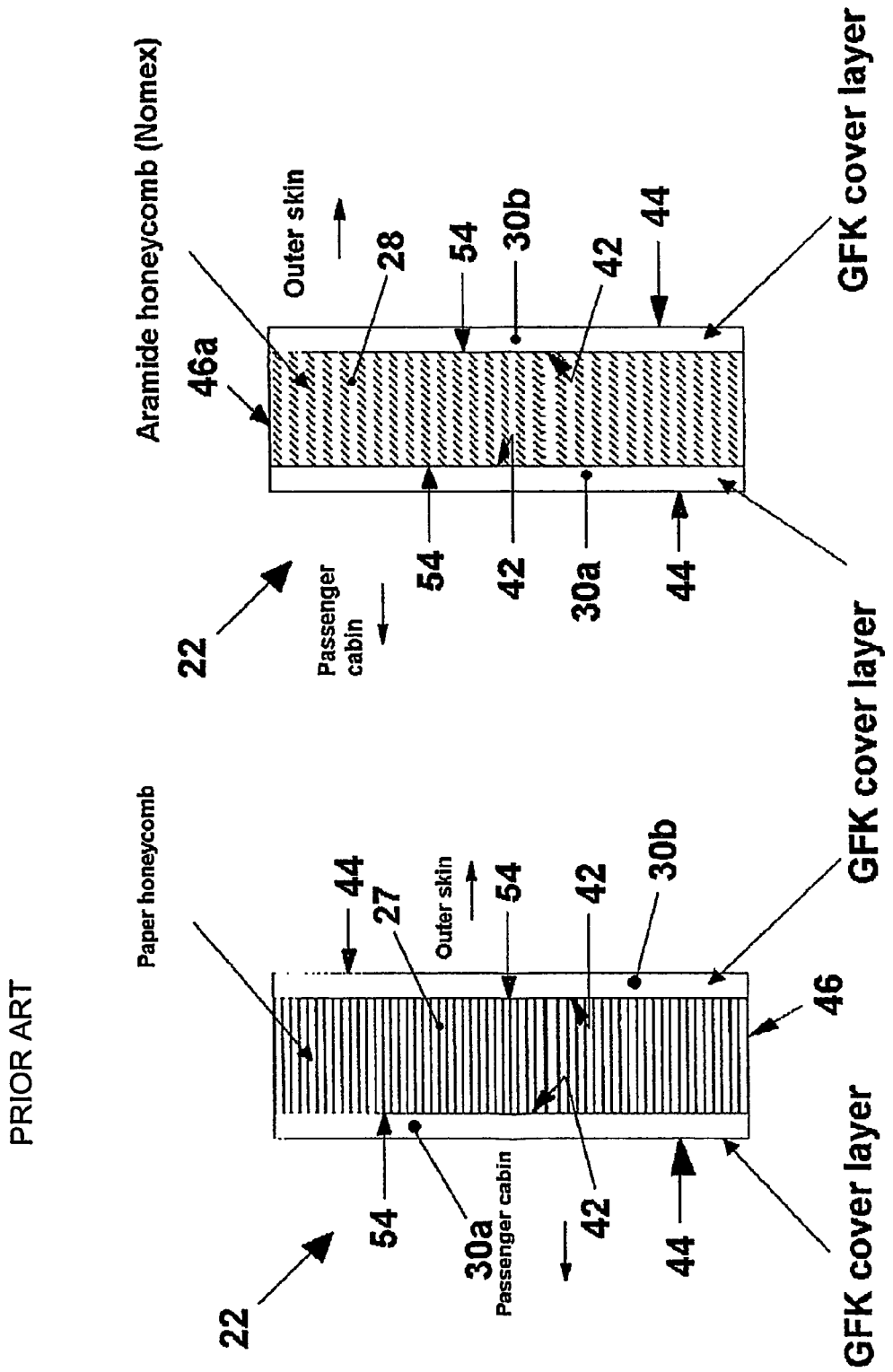
Figure 5:
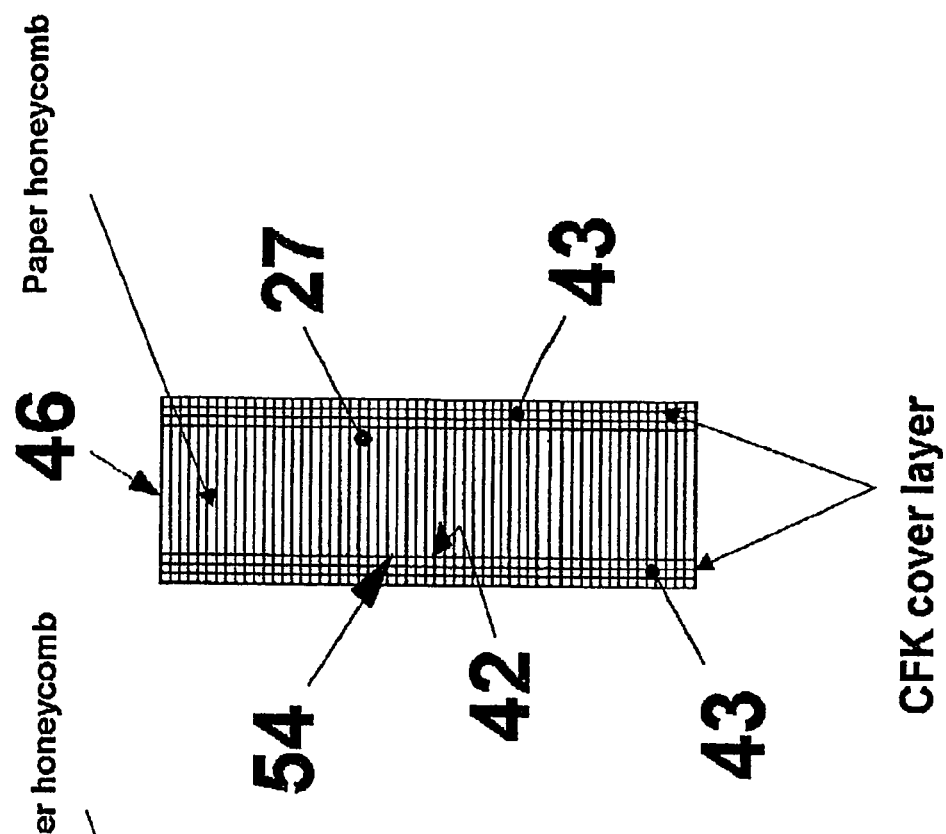
Figure 8:
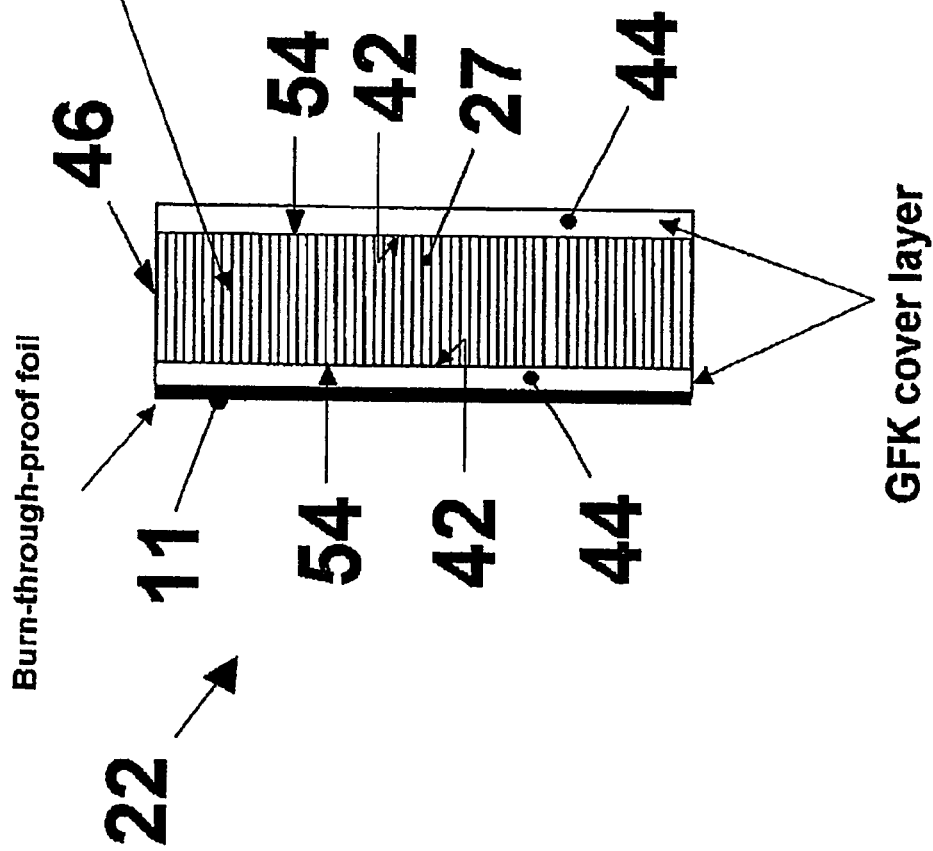
Figure 7:
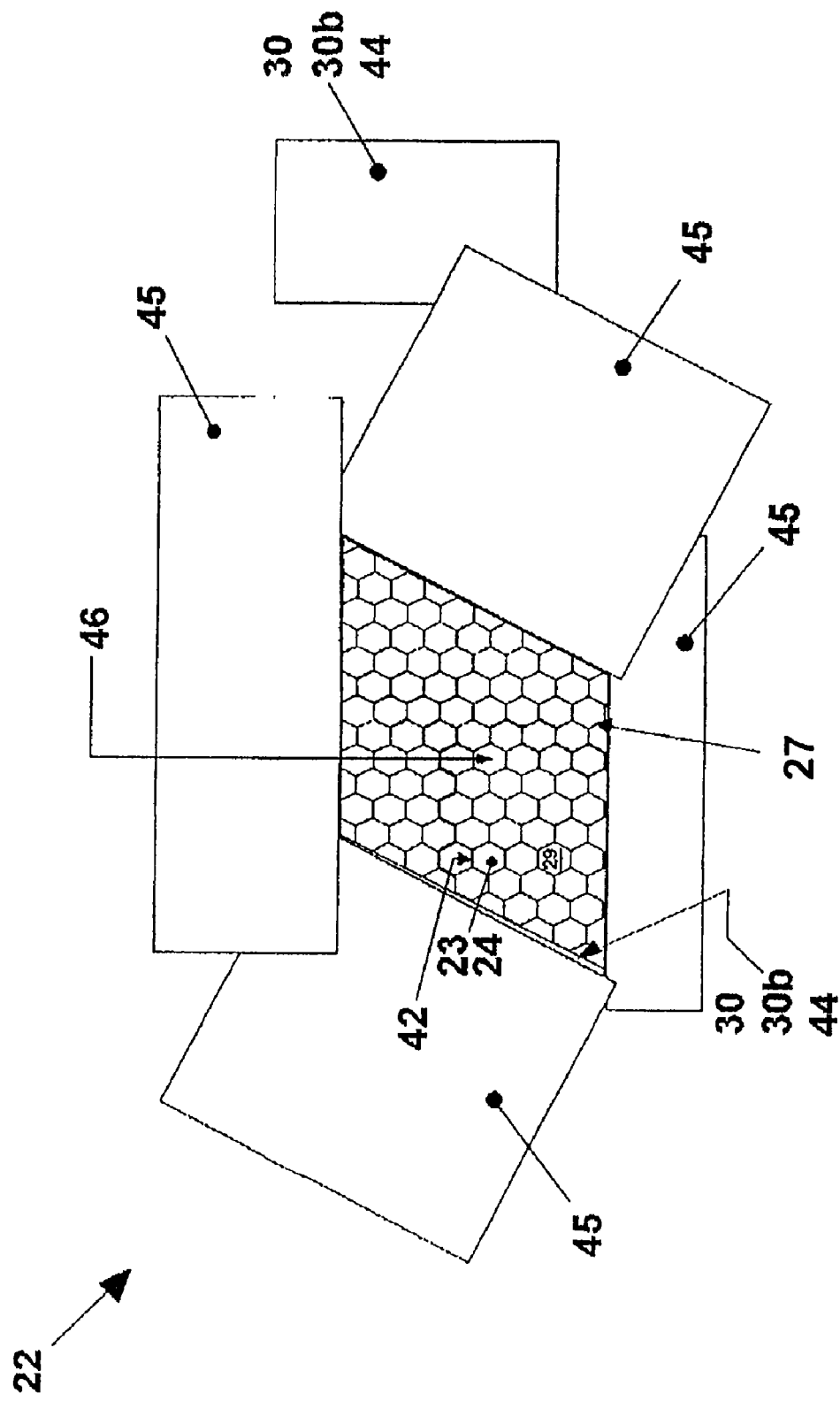

An exemplary embodiment of the invention is described in more detail with reference to the enclosed drawings. The following are shown:

FIG. 1 the arrangement of conventional interior panelling of a commercial plane near the outer skin of the fuselage without showing the installed fuselage insulation;

FIG. 2 conventional fuselage insulation in a commercial plane;

FIG. 3 a (so-called) post-crash fire scenario relating to an aircraft that has made an emergency landing;

FIG. 4 the conventional layer design of interior panelling (comprising a paper honeycomb structure), which interior panelling (honeycomb panelling) is not burn-through proof;

FIG. 5 the layer design of interior panelling (comprising a paper honeycomb structure), which interior panelling (honeycomb panelling) is believed to be burn-through proof or is believed to have improved burn-through characteristics;

FIG. 6 the layer design of interior panelling (comprising an aramide honeycomb structure), which interior panelling (honeycomb panelling) is believed to be burn-through proof or is believed to have improved burn-through characteristics;

FIG. 7 a top view of a honeycomb formation, comprising paper honeycomb, of a layer design of FIG. 4;

FIG. 8 the layer design of FIG. 4 (modified by comprising a burn-through-proof enclosing foil;

FIG. 9 the layer design of FIG. 5, expanded by an additional layer design of the same type, of interior panelling (comprising a paper honeycomb structure), which interior panelling (honeycomb panelling) is believed to be burn-through proof or is believed to have improved burn-through characteristics;

FIG. 9a the layer design of FIG. 4 modified by comprising a burn-through-proof barrier layer;

FIG. 9b the layer design of FIG. 5 (modified by comprising two burn-through-proof barrier layers; and FIG. 10 the layer design of burn-through-proof interior panelling (honeycomb panelling with a paper honeycomb structure) including a burn-through-proof insulation package attached to the interior panelling.

DETAILED DESCRIPTION OF EXEMPLARY EMBODIMENTS

A cabin panelling may be installed which encloses the aircraft cabin almost entirely. During a fire (e.g. a so-called "post-crash fire scenario"; e.g. FIG. 3), due to previous damage or burning-through (melting-through) of the metal outer skin, flames may act on the interior panelling. Thus in the case of a fire associated with an aircraft that has made an emergency landing and is situated on the ground, (ignited) burning kerosene leaking from said aircraft may cause both the aluminium cell of the aircraft structure and the interior insulation to burn through or burn down. Respective burn-through tests on aircraft fuselage structures have shown that within a timeframe of ninety seconds, both the aluminium outer skin (fuselage structure) of a passenger aircraft and the interior insulation (including the interior panelling) may burn through to such an extent that flashbacks into the interior of the passenger cabin may occur. These collected results show that evacuation of all injured and uninjured persons (passengers and aircrew) from the affected aircraft, or intervention by rescue teams of the fire brigade and medical first aid may be simplified or improved if the vehicle's cabin is provided with an improved insulation system, cladding, lining or panelling.

There are insulation systems which essentially substantially comprises a core material which is embedded in an insulation package, wherein the insulation package is enclosed by a plastic foil.

A core- and insulation material that may be used comprises products of the fiber industry, of which products in particular glass fiber materials (glass wool) are in widespread use. This material meets the requirements regarding thermal and acoustic insulation to a very large extent. In order to install (attach) the relatively amorphous semi-finished products to (or near) the aircraft fuselage structure, the insulation package (which is made from these semi-finished products) is enclosed in an enclosing foil. As far as the application of such insulation systems in aircraft engineering is concerned, there are the following disadvantages: insulation systems, which comprise glass wool and single plastic foils are assumed to provide a burn-through time of less than sixty seconds which may be sufficient in some cases and which may be sufficient. In an assumed case of a fire, for example associated with an aircraft on the ground which has made an emergency landing, which case is shown in the enclosed FIG. 2 (thus) the so-called post-crash fire scenario, burning kerosene may eventually may cause the aluminium cell of the aircraft structure and also the fuselage insulation (interior insulation) of the aircraft to burn through. There may be a desire to extend the burn through time.

Also, it may be desirable that aircraft components are prevented from falling to the floor and endanger the intended evacuation during a fire incident.

FIG. 1 shows a cross section of part of a fuselage of a passenger aircraft. It shows the arrangement of interior panelling 20, which is primarily honeycomb panelling 22.

This arrangement, shows that the interior panelling 20 is arranged close to the outer skin 33 of the (inner) fuselage structure, which in the installed state together with the outer skin 33 encloses a space 19 within which the fuselage insulation (not shown in FIG. 1) is installed. The further components and elements of the interior outfit and the fuselage structure, which are shown in FIG. 1 and are integrated in an aircraft passenger cabin 21 (as shown in FIG. 1), are not shown for the sake of simplification.

The above-mentioned fuselage insulation is shown in FIG. 2.

Apart from meeting the actual insulation objectives, said insulation is also to provide protection in those fire situations which unexpectedly occur when an aircraft has made an emergency landing and is situated on the ground, wherein leaking kerosene unexpectedly ignites, wherein the flames of said fire will lick against the aluminium outer skin and thus against the fuselage insulation. FIG. 3 shows such a situation which will be described in detail below.

For greater ease of understanding FIG. 2, it should be mentioned by way of an introduction—due to the overview provided—that the structural unit of the aircraft fuselage not only comprises stringers 31 with which all the panels of an outer skin 33 of an aircraft (fuselage) structure 8 are stiffened, but also comprises several ribs 32 which are arranged substantially perpendicular to the longitudinal axis 9 of the aircraft (approximately) at a distance c, and are attached to the stringer 31. Integrated in these ribs 32, on the unattached end is a (so-called) rib carrier 40 which continues on substantially parallel to the longitudinal axis 9 of the aircraft, wherein the (unattached free) end of the rib carrier 40 (according to this embodiment) is angled substantially perpendicular to the longitudinal axis 9 of the aircraft.

FIG. 2 shows the position of an insulation package 3 (with general reference characters) (of the fuselage insulation) on the (near) outer skin 33 of the aircraft. In each instance this insulation package 3 conventionally comprises a field insulation package 17 and a rib insulation package 16, which in the way are both installed separately and are attached near the outer skin 33 or are attached so as to rest against a stringer support surface 31a of the stringer 31 (i.e. in a defined structural zone of the aircraft fuselage structure).

FIG. 2 thus shows that a field insulation package 17 has been placed between the (two) ribs 32, spaced apart at a distance c, near (resting against) an inner area of a panel of the outer skin of the outer skin 33. Furthermore, a rib insulation package 16 has been placed onto the rib carrier 40, wherein said rib insulation package 16 is guided so as to be resting on both sides against the longitudinal sides 41 of the ribs. When viewed from the side as shown in FIG. 3, the rib insulation package 16 is guided not only on the so-called front longitudinal side 41 (the right-hand side) of the rib but also on the so-called rear longitudinal side 41 (the left-hand side) of the rib.

These two insulation packages are completely enclosed by a combustible plastic foil. They are arranged within that space 19 (shown in FIG. 1) which is constituted by the (traditionally installed) interior panelling 20 of the aircraft and the panelling of the outer skin 33.

In order to illustrate the situations focused at and believed to be improved in accordance with the present invention, and to further explain an increase in fire protection safety by partitioning off spaces, which spaces include a space 19 enclosed by the outer skin 33 and by interior panelling 19 of the aircraft cabin 21, said space 19 being arranged substantially parallel at a defined distance (transversely to the longitudinal axis of the fuselage 9), (with reference to FIG. 3) a "fire situation" involving an aircraft after an emergency landing will be described in the following which is believed to allow a better understanding of the measures and features of the present invention. If, in the context of such a (hypothetical) fire situation, referred to as a "post-crash fire scenario" 7, one considers that an emergency situation for passengers and the aircrew will result in a fire in the fuselage, i.e. in the interior of the cabin in the case of an aircraft structure 8 (damaged from the outside) (with a defective outer skin 33) following external mechanical action and a resulting fire acting on the shown aircraft regions due to spillage and ignition of kerosene, then it becomes clear that fire-protection measures have to be provided if the (possibly injured) passengers and flight crew are all as quickly as possible to be evacuated from the passenger area or cabin area to the outside of the aircraft by way of the emergency slide, i.e., within sufficient time.

Below, respective improvements and exemplary embodiments of the present invention are described with reference to FIGS. 5 to 10.

In order to provide better fire protection safety for separated interior space regions (cabin regions), for example of a passenger aircraft, which interior space regions are situated near the outer skin 33 of the aircraft fuselage, it should be mentioned at this point, in anticipation of FIG. 10, that with a burn-through-proof foil 11 made of a fireproof foil material (as disclosed therein) it is certainly possible to provide effective preventative fire protection to the interior panelling 20, in this case to the interior of an aircraft passenger-cabin 21, against any fire occurring.

This foil 11 will completely enclose a so-called insulation package 55 (fuselage insulation package), which for example results from the integration of a field insulation package 17 and a rib insulation package 18, which (in a way different to the situation in FIG. 2) are now combined as a package, which insulation package 55 is used for insulating the interior of a fuselage in line with the hitherto applied installation technology (installed so as to be supported by the stringer and resting against the ribs and installed near the outer skin 33). Advantageously, the paper honeycomb architecture of the insulation package 55 (fuselage insulation package), from a burn-through-proof barrier layer 58, will extend within the package cross section (the cross section of the insulation) right up to the foil margins, which barrier layer should comprise a material which is highly fireproof, with said material being sufficiently resistant and/or insensitive to any fire that might occur, and which barrier layer extends without interruption along the stretched length of the package.

As an alternative it would be imaginable that instead of the paper honeycomb 27 of the fuselage insulation package (as shown in FIG. 10) aramide honeycombs 28 (Nomex honeycombs) be used, in which case the arrangement of said barrier layer 58 would not be necessary. The foil enclosure with the proposed burn-through-proof foil 11, which may comprise a flame-rejecting foil material of considerable and long-lasting fireproofness which is resistant and/or insensitive to fire and which prevents any burning-through of the foil wall as a result of the influence of the flaming fire even during prolonged action on the surface area of the foil and prevents the flames licking towards the foil wall area, with the use of aramide honeycombs or some other suitable burn-through-proof honeycomb material as an insulation core material will not always provide the benchmark for expedient implementation of preventative fire protection on the insulation packet 55 (fuselage insulation packet), it will however make a considerable contribution to provide such fire protection.

In addition, the insulation package 55 may comprise a hole-like leadthrough 60 which is substantially congruent with a threaded drill hole 59 drilled in a cover layer 30*b* (as shown in FIGS. 5 to 10) arranged in the insulation core material, provided the insulation package 55 is arranged on the bottom-supported outer surface of this cover layer 30*b* or is aligned with a CFK-insulation layer 45 (possibly supported by said cover layer 30*b*. The insulation package 55 is attached with a burn-through-proof connection element 61, which for example comprises a polymer of poor thermal conductivity of sufficient strength, or at least comprises such an enclosure, to said bottom-supported GFK cover layer 30*b*, which connection element 61 is fed through the hole-like leadthrough 60 and can be screwed into the threaded drill hole 59. With this connection element, the presented insulation package 55 will be attached to the interior panelling 20 or to the honeycomb panelling 22 of the interior panelling 20, which will be discussed in detail below.

By providing the proposed foil material of the fuselage insulation package 19 on its own, it will not be possible (it is believed to not be possible) to counter the impending hazards in a (non-foreseeable and non-desired) case of a catastrophic fire involving an aircraft—for whatever reasons—in order to ward off the threatening hazards of a catastrophic fire. At least one cannot depend on this measure alone if one wishes to implement comprehensive preventative fire protection in the cabin region of an aircraft passenger cabin 21.

For this reason, the above-mentioned average person skilled in the art, who knows the state of the art as mentioned in the introduction, thanks to his/her creativity will seek further solutions in order to improve the interior space panelling from the point of view of fire protection.

Below, respective solutions (exemplary embodiments) for creating burn-through-proof interior space panels 20 as shown in FIGS. 5 to (9*a* and) 9*b* are proposed to said average person skilled in the art, which solutions, apart from the foil package 55 (attached to the honeycomb panelling 22), said person, since (during a simulated emergency) s/he cannot and will not solely depend on the burn-through-proof foil package 55, will want to principally incorporate into his/her further considerations for implementing preventative fire protection.

FIG. 4 shows a (so-called first) honeycomb formation 46 which may be used in the production of honeycomb panels 22 for aircraft construction. The honeycomb formation 46 integrates several paper honeycombs 27, arranged side by side, which (as shown in FIG. 7) are attached (glued) to each other along the circumference. The design of those honeycomb panels 22 is supplemented by (at least) two cover layers 30*a*, 30*b*, wherein in each instance one cover layer 30*a* or 30*b* is placed onto the cross section of the honeycomb body 27 (made of paper) and onto both ends of the bodies of the honeycombs, and at the location (shown by an arrow) of a point of adhesive bond 54 is attached to the honeycomb body 27. These cover layers 30*a*, 30*b* may comprise a combustible GFK material which while satisfying the hitherto specified parameters (strength, noise reduction etc.) has neither fire-blocking nor burn-through-proof qualities. Therefore, honeycomb panelling comprising panel-shaped GFK cover layers 44 and a honeycomb formation 46 of several honeycomb bodies 27 will provide for a fire protection which, however, may be further improved as will be described in the following.

In contrast to the above, honeycomb panelling 22 which has been implemented as shown in FIG. 5 will provide for further improved fire protection parameters. If the GFK cover layers 44 used in the construction of honeycomb panelling 22 according to FIG. 4 are replaced by CFK cover layers 43, one arrives at the proposed solution according to FIG. 5. This solution takes into account that a CFK cover layer 43 (in the same way as the honeycomb formation 48 made of paper honeycombs 27) on both sides of the honeycomb body 23 at the end 42 of the honeycomb body rests against the cross section 29 of the honeycomb body and is glued onto the paper honeycombs 27.

As an alternative, honeycomb panelling 22 is proposed which takes into account the exchange of the (first) honeycomb formation 46, integrated from several paper honeycombs 27, as shown in FIG. 4, by a honeycomb formation 46a, integrated from aramide honeycombs 28, as shown in FIG. 6.

Honeycomb panelling 22 designed in such a way will also be expedient for implementing preventative fire protection.

FIG. 7 shows the (previously mentioned) honeycomb formation 46 of the honeycomb panelling 22 shown in FIG. 4. This top view clearly shows the honeycomb bodies 23 of a honeycomb body arrangement implemented with the use of paper honeycombs 27. Also shown are the honeycomb body cross section 29 of said arrangement, which cross section is for example hexagonal, and the end 42 of the honeycomb body of the individual paper honeycomb 27. To achieve a further increase in the burn-through-proofness of this honeycomb panelling 22, it is imaginable that instead of the paper honeycombs 27 shown, corresponding aramide honeycombs 28 are used.

The solution according to FIG. 8 also uses honeycomb panelling 22 as shown in FIG. 4 and in addition a foil 11 which is arranged so as to rest flat against the outer surface of a GFK cover layer 44. This foil 11 comprises a fireproof foil material which renders the foil 11 substantially burn-through proof. This foil 11 is glued onto said outer surface by means of a fireproof adhesive. This provided honeycomb panelling 22 too will meet the requirements for implementing effective preventative fire protection in aircraft construction.

An arrangement as shown in FIG. 9 efficiently implements the ability of honeycomb panelling 22 which might become exposed to the flames of a fire for an extended period of time to not only hinder burn-through of the panel body, wherein the latter in the most unfavourable case finally (depending on the intensity of the effect of the flames) after a corresponding period of time will nevertheless burn through, but instead will display a burn-through-proof behaviour which will (to the furthest extent possible) entirely preclude flashback through the panel body, provided the installation of said panel body has been carried out in an expert manner.

Although the production of this burn-through-proof honeycomb panelling 20 will involve greater expenditure (concerning the use of materials and labour), the desired advantages for the intended purpose and use will outweigh this. This burn-through-proof honeycomb panelling 22 (interior panelling 20) is implemented with a first arrangement 50 which corresponds to the layer structure as shown in FIG. 5; and a second arrangement 51 with an identical layer structure (as shown in FIG. 5).

Accordingly, it is proposed that the first arrangement 50 be arranged with a top-supported and bottom-supported CFK cover layer 43, each resting above and below the honeycomb formation 46 (which comprises paper honeycombs 27), while the second arrangement 51 which has the same layer design is arranged in a laminar way, adjacent to the former, whose adjacent CFK cover layers 43 which are a top-supported cover layer 30a (CFK cover layer 43) of the first arrangement 50, and a bottom-supported cover layer 30b (CFK cover layer 43) of the second arrangement 51 or vice versa, are glued together.

Other arrangements (not shown in the Figures) comprising the same layer design (as shown in FIG. 5), which are arranged in a laminar way and adjacent to each other in series, up to a final nth arrangement, are also imaginable (depending on the desired thickness of the integrated honeycomb panelling 22 (interior panelling 20), wherein the cover layers 30a, 30b, which are adjacent to each other and lying one on top of the other, are glued. In this arrangement, the top-supported or bottom-supported cover layer 30a, 30b of the second arrangement 51, is glued on from the cover layer 30a, 30b of the serially following arrangement. To further improve the burn-through proofness of that proposed honeycomb panelling construction (those proposed honeycomb panel constructions) as shown in FIG. 9, it is proposed that instead of honeycomb formations 46 made with the use of paper honeycombs 27, honeycomb formations with aramide honeycombs 28 (Nomex honeycombs) be used instead and the thickness of the respective honeycomb formation 46 [the honeycomb length of the honeycomb bodies 23] (shown in correlation in FIG. 7) and/or that the thickness of the CFK cover layers 43 be varied.

A further option of increasing burn-through proofness is provided with the modification of a layer arrangement as shown in FIG. 5, whose honeycomb panel construction is implemented as shown in FIG. 9b with four honeycomb formations 46, 47, 48, 62 which are arranged in a laminar way side by side, whose adjacent ends 42 of the honeycomb body face each other.

FIG. 9a also shows such honeycomb panelling 22 which comprises two honeycomb formations 46, 47 with paper honeycombs 27. This arrangement comprises two honeycomb formations 46, 47 sandwiched between a burn-through-proof barrier layer 58. The barrier layer 58 comprises a material of a high fireproofness, which material is adequately resistant to and/or insensitive to fire. In this arrangement, this barrier layer is positioned adjacent to the body ends of the paper honeycombs 27, sandwiched between a first and a second honeycomb formation 46, 47, where it is immovably glued into place with a (previously mentioned) adhesive. The GFK cover layers 44 which adjoin the other side of the ends of the bodies of the paper honeycombs 27 too are glued on with the same adhesive.

Returning to the arrangement according to FIG. 9b it should also be added that those four honeycomb formations 46, 47, 48, 62 which comprise paper honeycombs 27 also comprise a barrier layer 49, 52, 53, as shown in FIG. 9, sandwiched between the adjacent honeycomb formations 46, 47 or 47, 48 or 48, 62. These barrier layers 49, 52, 53 are also attached in the way shown in FIG. 9a. In addition, a CFK cover layer 43 is positioned against the outer honeycomb formations 46 and 62 adjacent to the (hitherto) un-glued ends of the honeycomb bodies of the paper honeycombs 27, with said CFK cover layer being attached to the paper honeycombs 27 by gluing.

Accordingly, (as shown in FIG. 9b) the construction of the honeycomb panelling 22, apart from the first (used) CFK barrier layer 49, is additionally supplemented by a second CFK barrier layer 52 as well as by a third CFK barrier layer 53, wherein the stated outer honeycomb formations 46, 62 are facing towards the inner surface (pointed in the direction of the respective end of the paper honeycomb body) of the respective cover layer 30a, 30b and towards the paper honeycombs 27, supported and glued to the latter.

In this arrangement the first and second CFK barrier layer 49, 52 and the third CFK barrier layer 53 are a thick or thin CFK barrier layer. If possible at least one of the three CFK cover layers 49, 52, 53 is thin, wherein the thin CFK barrier layers 49, 52, 53 are made from a burn-through-proof plastic foil. With a view to improving the desired burn-through-proofness of this honeycomb panelling 22, at least one thick CFK barrier layer 53 should be arranged close to the CFK cover layers 43, wherein during installation of the honeycomb panelling it must be ensured that this CFK barrier layer 62 is installed closer to the outer skin 33 (than are the two other CFK barrier layers 49, 52).

Returning to the first explained solution shown in FIG. 10, it should be added that this solution uses honeycomb panelling 22 as shown in FIG. 4, at whose bottom-supported cover layer 30b, which faces the space 19 and thus the outer skin 33 of the aircraft, panel-shaped insulation 56 is arranged, which comprises a burn-through-proof material, for example a CFK material, and is positioned so as to rest flat against said cover layer 30b. Said elongated insulation package 55, which is completely enclosed by the burn-through-proof foil 11, is adjacent to this insulation 56. The bottom-supported GFK cover layer 30b, and if applicable also a burn-through-proof CFK insulation layer (not shown in the Figures), which CFK insulation layer is sandwiched in addition to the insulation 56 and the foil 11 and which is glued to the insulation 56 or to the outer foil surface of the foil 11, comprises/comprise a threaded drill hole 59 which extends substantially perpendicularly to the surface of this GFK cover layer 30b. Furthermore, the insulation package 55 comprises a hole-like leadthrough 60 which is substantially congruently to the threaded drill hole 59, provided the insulation package 55 is arranged on the outer surface of the bottom-supported GFK cover layer 30b, or the burn-through-proof CFK insulation layer 45.

By means of a burn-through-proof connection element 61, the insulation package 55 is attached to said bottom-supported GFK cover layer 30b, with said connection element 61 being inserted through the hole-like leadthrough 60 and being screwably attached by rotation in the threaded drill hole 59.

It should be noted that the application of the present invention is not limited to the aircraft industry. The fire insulation systems described above may also be implemented in any vehicles such as cars or busses, but also for any rooms or spaces requiring such protection.

REFERENCE CHARACTERS

1 Insulation material
2 Enclosing foil
3 Insulation package
4 First attachment element; insulation pin
7 Post-crash fire scenario; fire
8 Aircraft structure
9 Longitudinal axis of the aircraft
11 Burn-through-proof foil
12
13 Second attachment element, truncated-cone body
15
17 Field insulation package
18 Rib insulation package
19 Space
20 Interior panelling
21 Aircraft passenger cabin
22 Honeycomb panelling
23 Honeycomb body
24 Through hole; drill hole
25 First honeycomb panel
26 Second honeycomb panel
27 Paper honeycomb
28 Aramide honeycomb (Nomex honeycomb)
29 Cross section of the honeycomb body
30 Cover layer
30a Cover layer, top supported (facing the passenger cabin 21)
30b Cover layer, bottom supported (facing the outer skin 33)
31 Stringer
31a Stringer support area
32 Rib
32a First rib
32b Second rib
33 Outer skin
33a Inner area (of a panel of the outer skin 33)
40 Rib carrier
40a End (of the rib carrier 40)
41 Longitudinal side of the rib
42 End of the honeycomb body
43 CFK cover layer
44 GFK cover layer
45 CFK insulation layer
46 First honeycomb formation—with paper honeycombs 27
46a Honeycomb formation—with aramide honeycombs 28
47 Second honeycomb formation
48 Third honeycomb formation
49 First CFK barrier layer
50 First arrangement
51 Second arrangement
52 Second CFK barrier layer
53 Third CFK barrier layer
54 Point of adhesive bond
55 Insulation package
56 Burn-through-proof insulation
57 Non-burn-through-proof insulation
58 Barrier layer, burn-through-proof
59 Threaded drill hole
60 Leadthrough, hole-like
61 Connection element, burn-through-proof
62 Fourth honeycomb formation
c Spacing (between the ribs 32a, 32b)

The invention claimed is:

1. An interior panel of an aircraft passenger cabin, with which an outer skin of an aircraft is filled; which arrangement will provide protection against fire, the interior panel comprising:
honeycomb panelling, wherein the honeycomb panelling comprises:
at least two layers of a honeycomb body formation each of the at least two layers of the honeycomb body formation being made of a plurality of honeycomb cells arranged side by side, each of the at least two layers of the honeycomb body formation having an end of a cross section of the honeycomb body supported by and adhered to a cover layer such that the honeycomb panelling is formed of the at least two layers of the honeycomb body formation sandwiched between a top-supported cover layer facing the passenger cabin, and a bottom-supported cover layer facing a space on a side opposite to the passenger cabin, and the honeycomb panelling extends with the outer skin of the aircraft to follow the curvature of the outer skin, and each of the at least two layers of the honeycomb body formation is made of a paper or an aramid or a combination thereof and the bottom-supported cover layer or the top-supported cover layer or both are made of at least one carbon fiber reinforced plastics composite (CFK) layer or at least one glass fiber reinforced plastics composite (GFK) layer or both;

a burn-through-proof foil arranged such that the burn-through-proof foil conforms to an outer surface of the bottom-supported cover layer facing the space, wherein the burn-through proof foil is the outermost layer of the interior panel facing the outer skin of the aircraft.

2. The interior panel of claim 1, wherein at least one of the at least two layers of the honeycomb body formation is made of paper.

3. The interior panel of claim 1, wherein an inner cover layer adhered to the opposite end of the cross section of each of the at least two honeycomb body formations is made of carbon fiber reinforced plastics such that the at least two layers of the honeycomb body formation adhesively sandwiches the respective inner cover layers between the at least two layers of the honeycomb body formation forming the at least one burn-through-proof barrier layer.

4. The interior panel of claim 3, wherein the honeycomb panelling includes more than two of the at least two layers of the honeycomb body formation, each of the more than two of the at least two layers adhesively sandwiching the respective inner cover layers made of carbon fiber reinforced plastics between adjacent ones of the more than two of the at least two layers in series, wherein two of the inner cover layers which are adjacent to each other and lying one on top of the other are glued one to the other.

5. The interior panel of claim 1, further comprising at least one burn-through-proof carbon fiber reinforced plastics composite (CFK) barrier layer adhered between the bottom-supported cover layer facing the space and the burn-through-proof foil.

6. The interior panel of claim 5, wherein the at least one burn-through-proof carbon fiber reinforced plastics composite (CFK) barrier layer comprises a plurality of carbon fiber reinforced plastics composite (CFK) barrier layers.

7. The interior panel of claim 1, wherein each of the layers of the honeycomb body formation is made of an aramid.

8. The interior panel of claim 4, wherein each of the at least two cover layers is a carbon fiber reinforced plastics insulation layer.

9. The interior panel of claim 6, wherein at least one of the plurality of carbon fiber reinforced plastics composite (CFK) barrier layers are of a burn-through-proof plastic foil.

10. The interior panel of claim 1, wherein an adhesive bond between each of the at least two layers of the honeycomb body formation and the respective cover layer is implemented using a burn-through-proof adhesive.

11. The interior panel of claim 10, wherein the adhesive bond is non-detachable and burn-through proof.

12. The interior panel of claim 1, wherein the burn-through-proof foil completely encloses an insulation package.

13. The interior panel of claim 12, wherein the bottom-supported cover layer includes a threaded drill hole which extends substantially perpendicularly to the outer surface of the carbon fiber reinforced plastics layer or the glass fiber reinforced plastics layer.

14. The interior panel of claim 13, wherein the insulation package comprises a hole-like leadthrough extending through a thickness of the insulation package, the hole-like leadthrough being substantially congruently aligned with the threaded drill hole.

15. The interior panel of claim 14, wherein the insulation package is attached to the bottom-supported cover layer by a burn-through-proof connection element having a threaded end fed through the hole-like leadthrough and screwed into the threaded drill hole.

16. Insulation system for an outer skin of a vehicle, comprising:

a first plurality of honeycomb cells arranged side by side forming a first honeycomb body having a top face, and a second plurality of honeycomb cells arranged side by side forming a second honeycomb body having a bottom face, facing in an opposite direction of the top face of the first honeycomb body, the first honeycomb body being joined to the second honeycomb body by at least two carbon fiber reinforced plastics layers between the first honeycomb body and the second honeycomb body, and a top-supported cover layer glued on the top face for facing an interior of the vehicle and a bottom-supported cover layer glued on the bottom face wherein the first honeycomb body and the second honeycomb body are each comprised of a paper honeycomb or an aramid honeycomb;

a carbon fiber reinforced plastics composite (CFK) barrier layer being adhered to the bottom-supported cover layer; and a burn-through-proof plastic foil disposed as the outermost layer on the carbon fiber reinforced plastics composite (CFK) barrier layer, without any intervening metal layers between the burn-through-proof plastic foil and the second honeycomb body.

17. The insulation system of claim 16, wherein the at least two carbon fiber reinforced plastics layers includes at least one of the at least two carbon fiber reinforced plastics layers being made from a burn-through-proof plastics foil.

18. The insulation system of claim 16, wherein the top-supported cover layer or the bottom-supported cover layer further comprise:

a further carbon fiber reinforced plastics layer, a glass fiber reinforced plastics layer, a further honeycomb body additionally stacked on and glued to the honeycomb body or a combination thereof.

19. The interior panel of claim 12, wherein the insulation package comprises a burn-through-proof insulation.

20. The interior panel of claim 12, wherein the insulation package comprises a combustible insulation into which a burn-through-proof barrier layer is integrated within the combustible insulation, the burn-through-proof barrier layer extending completely through the combustible insulation to an exterior circumference of the insulation package completely enclosed by the burn-through-proof foil.

21. The interior panel of claim 20, wherein the insulation package is attached to the bottom-supported cover layer by a burn-through-proof connection element, the burn-through-proof connection element having a threaded end fed through a hole-like leadthrough extending through a thickness of the combustible insulation and the burn-through-proof barrier layer, and being screwed into a threaded drill hole in the bottom-supported cover layer facing the space.

* * * * *